March 10, 1936. R. M. BUFFINGTON 2,033,228
REFRIGERATING APPARATUS
Original Filed May 28, 1930
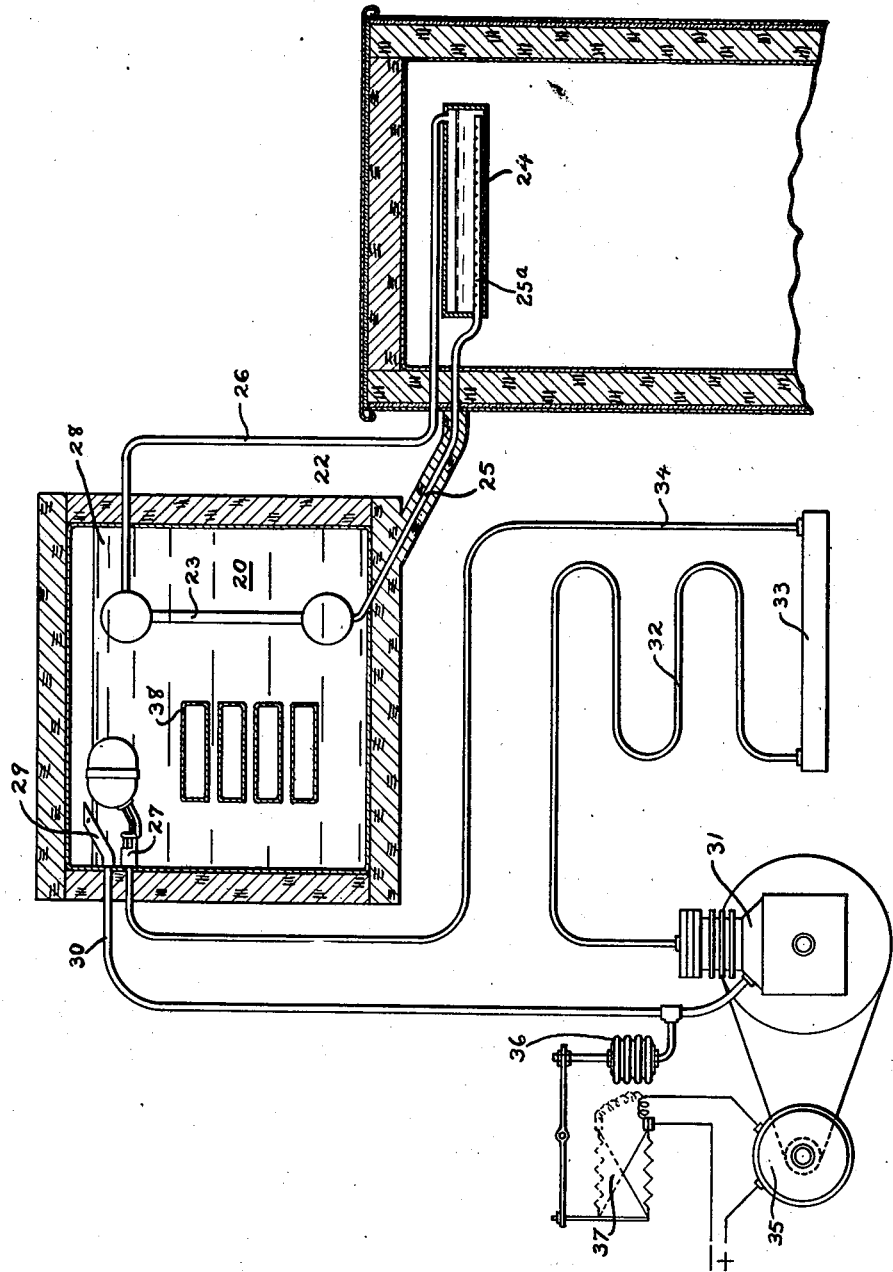
INVENTOR
Ralph M. Buffington,
BY
ATTORNEYS Patented Mar. 10, 1936

2,033,228

UNITED STATES PATENT OFFICE 2,033,228

REFRIGERATING APPARATUS

Ralph M. Buffington, Evansville, Ind., assignor, by mesne assignments, to General Motors Corporation, a corporation of Delaware Application May 28, 1930, Serial No. 456,617
Renewed July 24, 1935

7 Claims. (Cl. 62—178)

This invention relates to refrigerating apparatus and processes and more particularly to an apparatus and method for maintaining automatically two or more zones at different predetermined temperatures.

An object of this invention is to provide an apparatus and method for maintaining two or more zones at different predetermined temperatures.

Another object of this invention is to provide a method and apparatus for maintaining two or more zones at a predetermined differential in temperatures.

Further objects and advantages of the present invention will be apparent from the following description, reference being had to the accompanying drawing, wherein a preferred form of the present invention is clearly shown.

In the drawing the figure indicates diagrammatically an apparatus embodying features of this invention.

In practicing this invention a zone 20 may be maintained at a predetermined temperature, which may be substantially constant within predetermined temperature limits. Another zone 21 may be maintained at a second predetermined temperature, for instance at a substantially constant temperature within predetermined temperature limits. This may be accomplished by transferring heat from zone 21 to zone 20. For this purpose means 22 may be provided, said means 22 being adapted to maintain a substantially constant predetermined temperature differential between the zones 21 and 20.

The means 22 for transferring heat from the zone 21 to the zone 20 may include a closed cycle or flow system with a condenser 23 in said first zone 20 and an evaporator 24 in the second zone 21. The closed flow system may also include a line comprising a pipe or passageway 25, preferably insulated, for transferring liquid from the condenser 23 to the evaporator 24 and a pipe or passage 26 for transferring vapor from the evaporator 24 to the condenser 23.

The closed flow system 22 may contain a mixture of mutually soluble substances which create a liquid in said evaporator 24 boiling at a temperature to produce the desired predetermined temperature in the zone 21, and the mixture of substances may be such that its vapor produced in the evaporator 24 is condensed in the condenser 23 while the zone 20 is maintained at its predetermined temperature. The mixture of mutually soluble substances in the closed system 22 may, but need not, produce a homogeneous liquid, which liquid produces in the evaporator 24 a vapor which completely recondenses at the temperatures normally prevailing in the condenser 23. The vapor produced in the evaporator 24 also is of such a character that it contains different relative proportions of the mutually soluble substances from the proportions of said substances in the liquid from which the vapor is derived in the evaporator 24 or the vapor may contain only one of the mutually soluble substances. Thus the mutually soluble substances preferably are of different vapor pressures and fractionally distill and condense from each other. However the total pressures of the substances at all points of the closed system or cycle preferably are equal, neglecting slight differences such as those due to hydrostatic heads and the like. As examples of mixture which may be used in the closed system 22 the following may be noted: $CH_3Cl$ and $SO_2$; $CH_3Cl$ and $CHClF_2$; $CCl_2F_2$ and $CHCl_2F$; commercial low boiling point fractions from petroleum distillation, these fractions consisting of mixtures of two or more hydrocarbons having boiling points in the same general neighborhood; $NH_3$ and $H_2O$; gasoline and kerosene; $LiNO_3$ and $NH_3$.

The zone 20 may be maintained at a predetermined temperature, for instance at a substantially constant temperature between predetermined temperature limits, by any suitable means. Thus it may be provided with a float controlled valve 27 which maintains a body 28 of refrigerant such as $SO_2$ within the zone 20. The evaporated refrigerant may be discharged through the outlet device 29 to the passageway 30 leading to a compressor 31. The compressor 31 may discharge into a condenser 32 from whence the condensed refrigerant is discharged into a reservoir 33. From this the refrigerant may flow through the passageway 34 to the float controlled valve 27. The compressor 31 may be driven by a motor 35. A suitable control for maintaining the refrigerant body 28 at a predetermined temperature may be provided. Thus an expansible bellows 36 may be connected to be responsive to the pressure within the zone 20, for instance, by being connected to the vapor line 30. The bellows 36 may operate a snap switch 37 which controls the starting and stopping of the motor 35 in order to maintain the refrigerant body 28 between predetermined temperature limits.

The zone 20 may be insulated and may be used to provide refrigeration for any substance or substances requiring the temperatures prevailing in the zone 20. Thus sleeves 38 may be provided for freezing, or maintaining in a frozen condition, any substances to be placed therein such as water to be frozen, ice cream to be frozen or to be maintained frozen, and foods, such as meats, to be maintained in a frozen condition. The zone 21 may be an insulated food cabinet and may be used to refrigerate other substances requiring a higher temperature than that which prevails in the zone 20, and may be used for instance to store foods which require temperatures between 40 and 50 degrees Fahrenheit.

An advantage of this invention is that the mixture to be placed in the closed system 22 may be prepared outside of the system in bulk quantities for a large number of installations and may be charged into each system 22 without any necessary calibration as to pressures in the system. Another advantage is that a slight temporary leak does not disturb materially the original temperature differential which is sought to be maintained between the zones 20 and 21. This is so because there are such relatively large quantities of each constituent in the liquid in the evaporator 24, that, if any gaseous constituent should leak out of the system, some of the constituent in the liquid form would be evaporated to restore substantially the original vapor proportions of the constituents in the system. Another advantage is that the relative sizes of the evaporator and the condenser, and in fact any of the parts of the system, may be changed to a great extent without disturbing the original temperature differential which is sought to be maintained, and which is governed by the character of the mixture, which may be mixed before introduction into the system.

Means for insuring the mixture of the condensed liquid with the body of liquid in the evaporator 24 may be provided. This may be accomplished, for instance, by providing a perforated extension 25a into the evaporator 24, so that upon entering, the more volatile condensate tends to stir the body of liquid in the evaporator 24.

It is preferable to insure that there shall be no pockets or traps in the closed system, except in the evaporator 24, where liquid or vapor can accumulate. For this reason it is preferable to introduce the vapor into the condenser at the top, to remove the condensate from the condenser at the bottom, and to insure a thorough mixture of the incoming condensate in the evaporator.

Certain substances are mutually soluble, forming, over a range of proportions of the constituents, a plurality of liquids which exist in contact with each other, each liquid having, at constant temperature, a definite composition, as long as the other liquids are also present.

The composition of the vapor derived from each of such a group of liquids has the same definite composition, different in general from the composition of any of the liquids.

When heat is absorbed by any one of such a group of liquids in contact with each other, the resultant evaporation changes the composition of that liquid. In order to effect the necessary restoration of the original composition of that liquid, the excess of the constituents present in too great proportion separate out as liquids identical with other liquids in the group. Such substances can be used according to this invention.

While the form of embodiment of the invention as herein disclosed, constitutes a preferred form, it is to be understood that other forms might be adopted, all coming within the scope of the claims which follow.

What is claimed is as follows:

1. A refrigerating system comprising means for providing refrigeration in a first zone to maintain the temperature thereof between predetermined limits, means for producing refrigeration in a second zone to maintain said second zone between predetermined temperature limits, said last named means including a closed flow system with a condenser in said first zone and an evaporator in said second zone, and a mixture of mutually soluble halofluoro derivatives of aliphatic hydrocarbons in said closed system at substantially the same total pressure throughout the system which substances create a liquid in said evaporator boiling at a temperature to produce refrigeration in said second zone when its vapor is condensing in said condenser while said first zone is being maintained between its predetermined temperature limits.

2. A refrigerating system comprising means for producing refrigeration in a first zone to maintain the temperature thereof between predetermined limits, means for producing refrigeration in a second zone to maintain said second zone between predetermined temperature limits, said last named means including a closed flow system with a condenser in said first zone and an evaporator in said second zone, and a mixture of mutually soluble halofluoro derivatives of aliphatic hydrocarbons at least one of which is saturated in said closed system at substantially the same total pressure throughout the system which substances create a liquid in said evaporator boiling at a temperature to produce refrigeration in said second zone when its vapor is condensing in said condenser while said first zone is being maintained between its predetermined temperature limits.

3. A refrigerating method which comprises producing refrigeration in a first zone at a first predetermined temperature, producing refrigeration in a second zone at a second predetermined temperature by transferring heat from said second zone to said first zone by evaporating in a closed cycle from said second zone a mixture of mutually soluble halofluoro derivatives of aliphatic hydrocarbons and condensing in said first zone the vapor thus produced at the evaporating pressure.

4. A refrigerating method which comprises producing refrigeration in a first zone at a first predetermined temperature, producing refrigeration in a second zone at a second predetermined temperature by transferring heat from said second zone to said first zone by evaporating in a closed cycle from said second zone a mixture of mutually soluble halofluoro derivatives of aliphatic hydrocarbons at least one of which is saturated and condensing in said first zone the vapor thus produced at the evaporating pressure.

5. In refrigerating apparatus employing a primary circuit and a closed secondary circuit including a condenser and an evaporator operating at substantially the same pressures, the method which comprises, evaporating at a substantially constant temperature a mixture of mutually soluble refrigerants having different boiling points to produce a vapor wherein the percentage of the more volatile liquid constituent is greater than in the liquid mixture, condensing the vapor mixture at a substantially constant condensing temperature, lower than the temperature of evaporation, and returning the condensed mixture to be re-evaporated.

6. In refrigerating apparatus employing a primary circuit and a closed secondary circuit including a condenser and an evaporator operating at substantially the same pressures, the method which comprises, evaporating at a substantially constant temperature at least one of a mixture of mutually soluble liquids having different boiling points to produce a vapor wherein the percentage of the more volatile liquid constituent is greater than in the liquid mixture, condensing the vapor at a substantially constant condensing temperature, lower than the temperature of evaporation, and returning the condensed liquid to be re-evaporated.

7. In refrigerating apparatus employing a primary circuit having an evaporator maintained at a temperature below 32° F. and a closed secondary circuit including a condenser and an evaporator operating at substantially the same pressures, the method which comprises, evaporating at a substantially constant temperature above 32° F. at least one of a mixture of mutually soluble liquids having different boiling points to produce a vapor wherein the percentage of the more volatile liquid constituent is greater than in the liquid mixture, condensing, in heat exchanging relation, with the primary evaporator, the vapor at a substantially constant condensing temperature, lower than the temperature of evaporation, and returning the condensed liquid to be re-evaporated.

RALPH M. BUFFINGTON.